United States Patent
Rosenthal et al.

(10) Patent No.: US 7,267,707 B2
(45) Date of Patent: Sep. 11, 2007

(54) POLYURETHANE ENCAPSULATED FERTILIZER

(75) Inventors: Edward Rosenthal, Long Boat Key, FL (US); Leon E. Padgett, Jr., Lakeland, FL (US)

(73) Assignee: Florikan E.S.A. Corp., Sarasota, FL (US)

( * ) Notice: Subject to any disclaimer, the term of this patent is extended or adjusted under 35 U.S.C. 154(b) by 0 days.

(21) Appl. No.: 11/093,552

(22) Filed: Mar. 30, 2005

(65) Prior Publication Data

US 2006/0222735 A1 Oct. 5, 2006

(51) Int. Cl.
*A01N 25/26* (2006.01)

(52) U.S. Cl. .......................... 71/64.11; 71/84.07; 71/28

(58) Field of Classification Search ............... 71/64.07, 71/28, 64.11
See application file for complete search history.

(56) References Cited

U.S. PATENT DOCUMENTS

| | | | | |
|---|---|---|---|---|
| 3,158,462 A | | 11/1964 | Wilson | 504/101 |
| 3,223,518 A | * | 12/1965 | Hansen | 71/64.07 |
| 3,259,482 A | | 7/1966 | Hansen | 71/64.11 |
| 3,264,089 A | * | 8/1966 | Hansen | 71/64.11 |
| 4,857,098 A | | 8/1989 | Shirley | 71/28 |
| 5,147,442 A | | 9/1992 | Kosuge et al. | 71/64.07 |
| 5,538,531 A | * | 7/1996 | Hudson et al. | 71/28 |
| 5,652,196 A | * | 7/1997 | Luthra et al. | 504/359 |
| 6,039,781 A | * | 3/2000 | Goertz et al. | 71/1 |
| 6,364,925 B1 | * | 4/2002 | Markusch et al. | 71/64.07 |
| 6,500,223 B1 | | 12/2002 | Sakai et al. | 71/64.07 |
| 6,617,412 B2 | * | 9/2003 | Markusch et al. | 528/65 |
| 6,656,882 B2 | * | 12/2003 | Tijsma et al. | 504/101 |

* cited by examiner

*Primary Examiner*—C. Sayala
(74) *Attorney, Agent, or Firm*—Hunton & Williams LLP; Eugene C. Rzucidlo

(57) ABSTRACT

A polyurethane encapsulated, slow release fertilizer with a coating based upon an isocyanate component and an isocyanate-reactive component comprising a polyether polyol. The process for producing such particles comprises applying an isocyanate-reactive component comprising a polyether polyol onto fertilizer particles to form coated fertilizer particles, applying an isocyanate component onto said coated fertilizer particles; and forming the polyurethane encapsulated fertilizer particles.

20 Claims, 1 Drawing Sheet

POLYURETHANE ENCAPSULATED FERTILIZER

FIELD OF THE INVENTION

Figure 1:
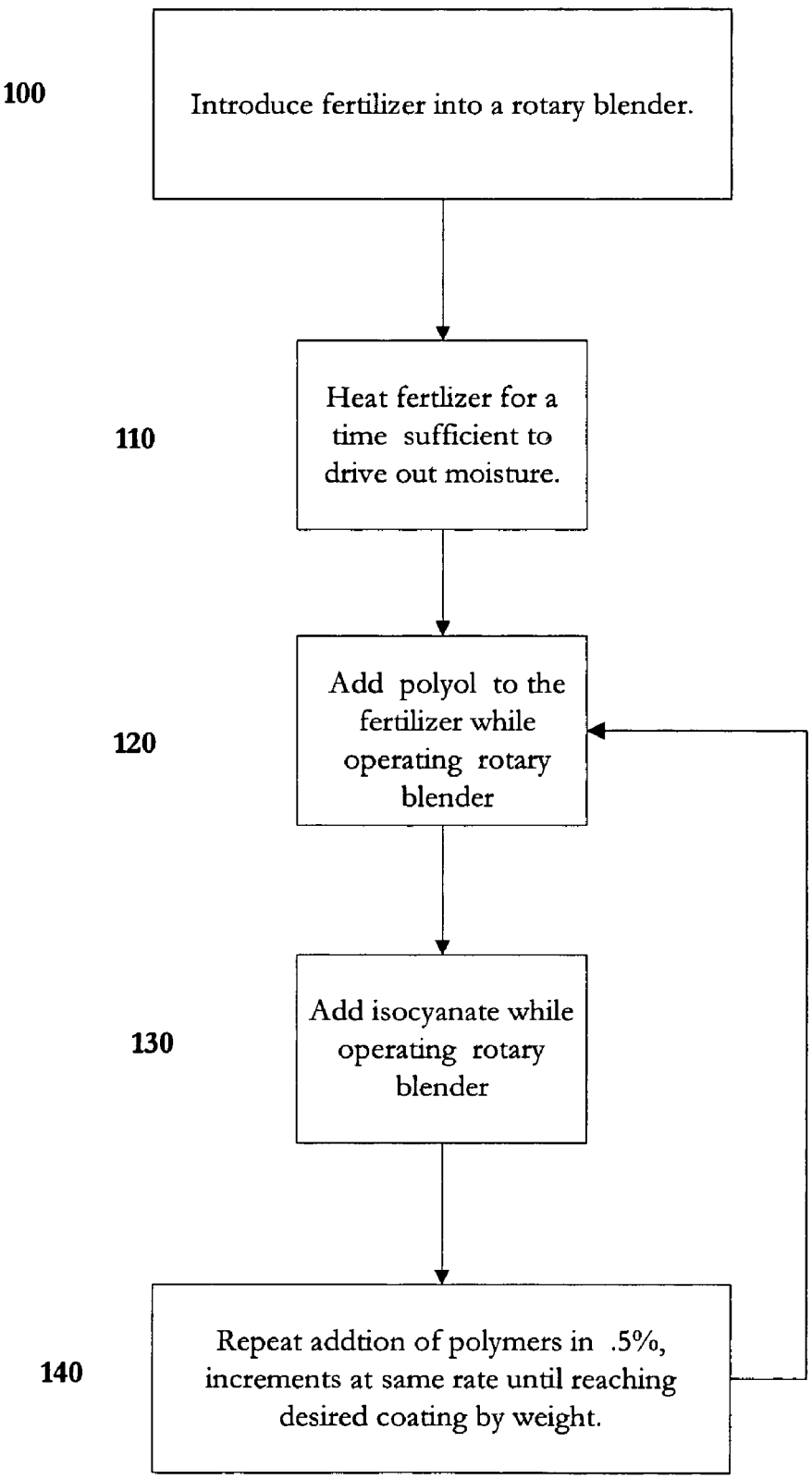

This invention relates to the art of fertilizer and, more particularly, to a coated granular fertilizer in which the dissolution rates of water-soluble fertilizer components are controlled by coating or encapsulating a granular fertilizer.

BACKGROUND OF THE INVENTION

Achieving crop fertilization by timing the release or application of fertilizer nutrients is known. Fertilization in the container-grown wholesale plant industry, for example, has been accomplished by methods including:
  Multiple applications of granular fertilizer
  Overhead liquid application of soluble fertilizers
  Incorporating slow release fertilizers into potting soil
  Polymer coated fertilizers.

Each of these methods and compositions has associated drawbacks. A description of the drawbacks associated with prior art methods and compositions can be found in U.S. patent application Ser. No. 10/973,732, which is incorporated in its entirety herein.

Encapsulating fertilizers to slowly release nutrient to plants is known. Slow release fertilizers delay the dissolution of the fertilizer substrate. Most slow release fertilizers, however, are not dependable in adverse environmental conditions such as high heat and moisture. Hot and wet conditions can cause slow release fertilizers to flash release, causing damage to both the plant material and the environment.

Prior art methods include encapsulating a fertilizer having a given chemical composition or compound such that the nutrients are released over a period of time. For example, coated urea has been used as a source of time released nitrogen, which is a nutrient that promotes plant height and leaf formation in a plant. U.S. Pat. Nos. 5,147,442, 5,560,768 and 6,500,223 each of which is incorporated in its entirety, illustrate such coated fertilizers and methods associated with them.

Encapsulated slow-release fertilizers may be classified into two major groups according to the fertilizer release mechanism:

(i) A first group in which the release is governed by the rate of water permeation through a polymeric or copolymeric membrane of the water-proofing material, and by the rate of fertilizer diffusion away from each coated particle into the surrounding soil. Typical examples of membrane material in slow-release fertilizers of this group are copolymers or glyceryl esters of unsaturated acids with dicyclopentadiene (U.S. Pat. No. 3,223,518), epoxy-polyester resins (U.S. Pat. No. 3,259,482), urethanes (U.S. Pat. No. 3,264,089) and polystyrenes (U.S. Pat. No. 3,158,462).

(ii) A second group with relatively thick encapsulating coats, in which release is governed mainly by rupture of the coat, a typical example being particulate fertilizers with sulfur based encapsulation. The rupture occurs upon the permeation of water into the coated particles as a result of the osmotic pressure that builds up within. The sulfur based coating in slow-release fertilizers of this second group are generally produced by spraying onto the particulate fertilizer a molten sulfur based material as disclosed, for example, in U.S. Pat. No. 4,857,098.

Inefficient fertilization using past existing polymer coated fertilizers described at (i) and (ii) above increases costs and losses with respect to crops. In order to achieve the safe release of nutrient, current slow-release coated fertilizers must be relatively thickly coated, as measured by percentages of weight. Thicker coatings are necessarily more costly as result of, inter alia, the need for more coating materials. What is needed is an encapsulated slow-release fertilizer that can safely release nutrient to plants using coating that is more efficient.

SUMMARY OF THE INVENTION

The present invention provides a process for producing polyurethane encapsulated, slow-release fertilizer particles. The process comprises applying an isocyanate-reactive component that includes a polyether polyol onto fertilizer particles to form a coating on the fertilizer particles, and applying an isocyanate component onto said fertilizer particles. The applications of each component may be repeated so as to form the polyurethane encapsulated fertilizer particles comprising up to about nine percent of said coating by weight.

Another embodiment provides coated granular fertilizer comprising polyurethane encapsulated, slow release fertilizer particles comprising a coating of up to about six percent of said coating by weight, said wherein the coating releases nutrient from a nutrient substrate. The conditions for each of the nutrient release rates below are at 100 degrees Fahrenheit—(e.g.: nitrogen release at about 1,120 ppm at 100 degrees Fahrenheit). The nutrient substrate can include potassium nitrate in the percentages of 12-0-43 (N-P-K) at release rates comprising from about 1,120 ppm to about 35,000 ppm of nitrogen in about one day, from about 5,200 ppm to about 74,000 ppm of nitrogen in about three days, and from about 10,500 ppm to about 104,000 ppm of nitrogen in about seven days. The coated fertilizer also can release from about 1,000 ppm to about 15,000 ppm of potassium in about one day, from about 3,000 ppm to about 170,000 ppm of potassium in about three days, and from about 19,000 ppm to about 212,000 ppm of potassium in about seven days.

The nitrogen release of this coated fertilizer at about four percent of the coating is about 17,200 ppm of nitrogen in about one day, about 74,000 ppm of nitrogen in about three days, and about 104,000 ppm of nitrogen in about seven days. At about five percent of the coating by weight the coating releases nutrient at rates comprising about from about 14,600 ppm to about 35,000 ppm of nitrogen in about one day, from about 41,500 to about 58,000 ppm of nitrogen in about three days, and from about 58,000 to about 94,000 ppm of nitrogen at 100 degrees Fahrenheit in about seven days. Nitrogen release at about six percent of said coating by weight is from about 1,120 ppm to 12,400 ppm of nitrogen in about one day, from about 8,600 ppm to about 36,000 ppm of nitrogen in about three days, and from about 16,500 ppm to about 54,200 ppm of nitrogen in about seven days. When the coating is about eight percent by weight, nitrogen release rates comprise about 2,300 ppm in about one day; about 5,200 ppm in about three days; and about 10,500 ppm in about seven days.

As regards potassium release, when the coating of the granular fertilizer is about four percent of the coating by weight the coating releases potassium at rates comprising about 12,000 ppm of potassium in about one day, about 170,000 ppm of potassium in about three days, and from about 212,000 ppm of potassium in about seven days. At about five percent of the coating by weight, the release rates comprise from about 12,000 ppm to about 15,000 ppm of potassium in about one day, from about 45,000 ppm to about 120,000 ppm of potassium in about three days, and from about 110,000 ppm to about 184,000 ppm of potassium in about seven days. Potassium release rates at about six percent of the coating by weight comprise: from about 1,000 ppm to about 10,000 ppm of potassium in about one day, from about 3,000 ppm to about 90,000 ppm of potassium in about three days, and from about 19,000 ppm to about 105,000 ppm of potassium in about seven days. When the coating is about eight percent by weight, potassium release rates comprise about 1,000 ppm in about one day; about 4,000 ppm in about three days; and about 19,000 ppm in about seven days.

The polyurethane encapsulated, slow release fertilizer's coating can be based upon an isocyanate component and an isocyanate-reactive component comprising a polyether polyol.

DETAILED DESCRIPTION OF THE DRAWINGS

FIG. 1 is an overall block flow diagram of the method of the invention.

DETAILED DESCRIPTION OF THE INVENTION

The coated granular fertilizer according to the invention can comprise a particulate fertilizer to be covered with a resin composition. The particulate fertilizer used in the present invention is not critical with respect to the type and may be any known chemical fertilizer. Examples of the fertilizer include ammonium sulfate, ammonium chloride, ammonium nitrate, urea, potassium chloride, potassium sulfate, potassium nitrate, sodium nitrate, ammonium phosphate, potassium phosphate, calcium phosphate, and composite fertilizers thereof.

The granular fertilizer is coated with a water-resistant film-forming polyurethane composition. The composition should comprise a isocyanate-reactive polyether polyol and an isocyanate component, and optionally, other polymers, waxes, inorganic and organic powders and surface active agents. The waxes used in the present invention may be any waxes provided that they are soluble in solvents for the essential polymers. Examples of such waxes include paraffin wax, hardened oils, bee wax, Japan wax, rosin, petroleum resins and the like.

The invention provides compositions and methods for delivering the proper nutrition to plants by the encapsulation of fertilizer particles. The term "fertilizer" as used herein denotes an at least moderately water-soluble chemical substance or mixture of such substances, and the term "particulate fertilizer" used herein denotes any type of comminuted fertilizer such as granulated, pelleted, or microgranulated and the like. Nutrient releases is described in terms of parts per million (ppm) at about plus (+) or minus 20% (−) of the ppm given (i.e. + or−1,000 ppm of potassium release).The following examples further illustrate details for the process of the present invention, and the preparation of the compositions of this invention. The invention, which is set forth in this disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all parts and percentages are parts by weight and percentages by weight, respectively.

EXAMPLES

Polyol: a polyether polyol obtained by adding propylene oxide to a glycerine nucleus. The polyol has a hydroxyl number of from about 388 to about 408, a nominal functionality of about 3; and a nominal molecular weight of about 400. Its density in lbs/gallon at 77 degrees Fahrenheit is about 8.75; at 100 degrees Fahrenheit is about 8.68 and at 120 degrees Fahrenheit is about 8.61. The polyol's viscosity is about 360 cps at 77 degrees Fahrenheit, about 160 cps at 100 degrees Fahrenheit, and about 78 cps at 120 degrees Fahrenheit. It has a specific heat of 0.5 BTU/lb Fahrenheit, and a thermal conductivity of 0.087 BTU/lb ft$^2$ Fahrenheit/in. An exemplary polyol is commercially available as BASF Plurocol GP430.

Isocyanate: A polymethylene polyphenylpolyisocyanate having a NCO content of about 31.5% by weight, a viscosity of about 200 cps, at about 25 degrees, a hydrolyzable chlorine of about 0.035% by weight, a flash point of about 200 degrees, density of about 1.23 g/cm$^3$ at about 25 degrees, an initial boiling point of about 190 mm Hg at about 25 degrees; and vapor pressure of about 0.0002 mm Hg at about 25 degrees. The isocyanate is a polymeric MDI with a functionality of about 2.7 An example is commercially available as BASF Lupranate M20S Encapsulation of Fertilizer Pellets:

Among other things, compositions and methods of the present invention can provide proper nutrition to plants in the differing stages of plant growth. In a non-limiting example, semi-permeable resin membranes encapsulate particulate fertilizers. The membranes differ in porosity. The porosities are matched to the solubility of each specific nutrient to control the speed of release. During manufacturing, the thickness of the resin coating together with the choice of resin type coating membrane, creates the release criteria. The fertilizer substrate releases by timed osmosis back through release channels of the semi-permeable membrane, providing the corresponding nutrient to the crop. By matching each nutrient to a given porosity of the membranes, as well as adjusting resin thickness, the process individually controls the time release of each nutrient such at least one plant receives the appropriate fertilizer nutrient at the differing stages of the a plant's growth. A description of proper nutrition in a plant in the differing stages of plant growth as well as exemplary methods and compositions for providing such nutrition can be found in U.S. patent application Ser. No. 10/973,732, incorporated herein.

FIG. 1 is an overall block flow diagram of the method of the invention. The method begins by introducing the fertilizer particles into a rotary blender 100. In one example, 50 lbs of substrate potassium nitrate is introduced into the blender. The substrate is then heated 110 to approximately 60 degrees for time sufficient to drive all moisture out of the material.

An isocyanate-reactive polyether polyol is applied onto the fertilizer particles to form a coating on said fertilizer particles 120. For example, two ounces of the polyol component (Plurocol) can be added to the substrate. No pressure is used, and the material is slowly poured onto the substrate while the rotary blender is in operation. The relatively low viscosity of the polyol allows rapid and even coverage of all the substrate particles. Next, the isocyanate component is applied to the fertilizer 130. In the example, after 2 minutes of blending, the isocyanate (Lupranate) binder is introduced, again by simply pouring it into the agitating material. Complete reaction can occur within about 6 to 7 minutes without any clumping of the processed substrate at any time during the reaction. This process can then be repeated 140, without increasing the rate of application. Modifications may include pre-sealing the substrate material with vegetable oil or polyethylene, and/or using an outer layer of wax or polyethylene to extend release time. Analysis of these examples made via the method are shown in Table 1.

In another example, five (5) batches of polyurethane encapsulated fertilizer are made using following procedure. A potassium nitrate substrate of 13.5-0-45 (N-P-K) is heated about 225 degrees F., with the temperature kept constant a plus or minus 15 degrees throughout process. A fine granular matter, such as ionized iron oxide pigment, may then be added at 0.5% to the heated substrate. Then 0.5% canola oil may be added. This seals imperfections in the individual prills, allowing the polymers to form completely around each prill. The use of the vegetable oil (e.g. canola) in this process eliminates premature or "flash release" of nutrients, which can cause burn to plants. The addition of iron oxide is also coloring process, giving the prills a brownish red color. Pluracol is then added at 0.75% and allowed to mix thoroughly. Then 0.75% of the lupranate is added. Reaction time is complete in 7-8 minutes at the heated temperature, and the momentary clumping does not occur at this temperature. This process may then be repeated 3 more times, with each addition of polymer weighed carefully, so the final product has 6 lbs of polymer reacted. By calculated weight, the polymer coating is 6/107lbs., or 5.6%. (With respect to the polymer coated potassium nitrate, the percentages of 12-0-43, as used herein, are shown using this example. Beginning with 100 lbs of 13.5-0-45, then the final analysis would be 100/107 ×13.5-0-45, which is 12.6-0-42.05. Primary nutrients (N-P-K) are expressed as whole numbers, so the percentages are expressed as 12-0-42.) Analysis of these examples is shown in Table 3. Analysis:

Using this process, one set of samples of the polyurethane encapsulated fertilizer particles beginning with the initial coating of about 0.5% up to about 6% coating by weight were retained. Beginning with the coating at about the 3% level, after 12 days in room temperature water, prill failure rate was less than 3% of the prills, going down to the 6% coating, which exhibited two (2) prills which became soft and floated up after stirring the sample of 2 tbsp in 6 oz of water. The samples' demonstrated resistance to prill failure shows that the coated fertilizer is not subject to unsafe flash release.

Samples of polyurethane encapsulated fertilizer particles with the 3%, 4%, 5% and 6% coatings were compared to 2 month (H2), 4 month (H4), and 8 to 9 (P8) month coated time released potassium nitrate commercially available from Haifa and Pursell. All of the compared coated fertilizers included time released potassium nitrate at the percentages of 12-0-43 (N-P-K) as the fertilizer substrate. The results of the comparison of the exemplary polyurethane encapsulated fertilizer particles of the present invention at 4% (A4), 5% (A5) and 6% (A6) levels of coating are shown below in Table 1.

With respect to the 2 to 3 month Haifa product (H2) vs. the A4 sample, the A4 demonstrated tighter release at day one. All nutrient release was trialed at 100 degrees Fahrenheit. As shown in Table 1 below, A4 released Nitrogen at 17,200 parts per million (ppm) versus H2's Nitrogen release at 36,200 ppm; A4's potassium release was 12,000 ppm versus H2's 90,000 ppm. This indicates that the A4 can perform very well even at about a 3.5% level of coating. A4 showed to be still tighter than H2 at the 7 day level, since A4 released Nitrogen at 104,000 ppm versus H2's Nitrogen release at 111,600 ppm and A4's potassium release of 212,000 ppm versus H2's 224,000 ppm.

When compared to the 4 to 5 month Haifa product (H4), the A5 sample was so much tighter that a coating of up to from about 4% to about 4.5% could safely be used over the same time period as the H4 product.

As regards the A6 sample when compared to the 8 to 9 month Polyon (P8), the A6 sample demonstrated comparable results through the 3 and 7 day results, although the A6 more slowly released nutrient. The slower release of nutrient indicates that there may be up to thirty days longevity in field performance.

The results in Table 1 below show that the encapsulated fertilizer particles of the present invention have tighter upfront release of nutrient, which demonstrates complete safety to plants. The comparative results are set forth in Table 1 below. It is seen that the conductivity values, the measurement of low soluble salts, go down with each additional layer of polymer, indicating that release longevity can be controlled by amount of polymer added. Also, the encapsulated fertilizer particles when placed in water for 3 weeks showed no susceptibility to flash release.

TABLE 1

| SAMPLE ID | PARAMETER | UNIT | NUTRIENT RELEASE AT 100° F. | | |
|---|---|---|---|---|---|
| | | | DAY 1 | DAY 3 | DAY 7 |
| A4 12-0-43 | Nitrogen | ppm | 17,200 | 74,000 | 104,000 |
| | Potassium | ppm | 12,000 | 170,000 | 212,000 |
| | Conductivity | mmhos/cm | 92.00 | 658.00 | 900.00 |
| A5 12-0-43 | Nitrogen | ppm | 14,600 | 58,000 | 94,400 |
| | Potassium | ppm | 12,000 | 120,000 | 184,000 |
| | Conductivity | mmhos/cm | 102.00 | 520.00 | 740.00 |
| A6 12-0-43 | Nitrogen | ppm | 12,400 | 36,000 | 54,200 |
| | Potassium | ppm | 10,000 | 90,000 | 114,000 |
| | Conductivity | mmhos/cm | 60.00 | 248.00 | 452.00 |
| H2 12-0-43 | Nitrogen | ppm | 36,200 | 98,000 | 111,600 |
| | Potassium | ppm | 90,000 | 206,000 | 224,000 |
| | Conductivity | mmhos/cm | 682.00 | 874.00 | 960.00 |
| H4 12-0-43 | Nitrogen | ppm | 34,000 | 74,000 | 84,600 |
| | Potassium | ppm | 70,000 | 176,000 | 192,000 |
| | Conductivity | mmhos/cm | 504.00 | 700.00 | 818.00 |

TABLE 1-continued

| SAMPLE ID | PARAMETER | UNIT | NUTRIENT RELEASE AT 100° F. | | |
|---|---|---|---|---|---|
| | | | DAY 1 | DAY 3 | DAY 7 |
| P8 12-0-43 | Nitrogen | ppm | 13,800 | 38,000 | 56,800 |
| | Potassium | ppm | 20,000 | 82,000 | 118,000 |
| | Conductivity | mmhos/cm | 148.00 | 342.00 | 486.00 |

The results in Table 2 below show that the encapsulated fertilizer particles of the present invention have tighter upfront release of nutrient, which demonstrates complete safety to plants. In the examples set forth, the coating was up to about eight to nine percent. The coating percentages are listed in the table. Among other things, these exemplary results indicate that a coating of 6% can be designed to release over 9 months.

failure. Samples of the products were sent to lab for accelerated release tests on 6 pound polymer levels. Tests done on products when the isocyanate-reactive polyether polyol and isocyanate component were added at 2% per layer showed tendency to agglomerate and lose coating to blender surface, so 1.5% maximum has been adopted. The results in Table 3 below also show that the encapsulated fertilizer particles of the present

TABLE 2

| SAMPLE ID | PARAMETER | UNIT | NUTRIENT RELEASE AT 100° F. | | |
|---|---|---|---|---|---|
| | | | DAY 1 | DAY 3 | DAY 7 |
| Fertilizer A - 11-8 | Nitrogen | ppm | 5,600 | 7,400 | 11,600 |
| (At about 8%) | Potassium | ppm | 2,000 | 3,000 | 23,000 |
| | Conductivity | mmhos/cm | 14.00 | 20.00 | 120.00 |
| Fertilizer A - 11-9 | Nitrogen | ppm | 6,600 | 7,600 | 12,000 |
| (At about 9%) | Potassium | ppm | 3,000 | 4,000 | 184,000 |
| | Conductivity | mmhos/cm | 19.00 | 27.00 | 110.00 |
| Fertilizer A - 15-4 | Nitrogen | ppm | 35,000 | 41,500 | 58,000 |
| (At about 5%) | Potassium | ppm | 15,000 | 45,000 | 110,000 |
| | Conductivity | mmhos/cm | 96.00 | 226.00 | 596.00 |
| Fertilizer A - 15-6 | Nitrogen | ppm | 5,600 | 8,600 | 16,500 |
| About 6%) | Potassium | ppm | 1,000 | 3,000 | 56,000 |
| | Conductivity | mmhos/cm | 4.00 | 23.00 | 232.00 |
| Fertilizer A - 15-8 | Nitrogen | ppm | 2,300 | 5,200 | 10,500 |
| (About 8%) | Potassium | ppm | 1,000 | 4,000 | 19,000 |
| | Conductivity | mmhos/cm | 10.00 | 30.00 | 111.00 |

| SAMPLE ID | PARAMETER | UNIT | Result | Detection Limit |
|---|---|---|---|---|
| Fertilizer A - 15-8 | Total Nitrogen (N) | % | 13.06 | 0.10 |
| | Soluble Potash (K2O) | % | 40.01 | 0.01 |
| | Iron (Fe) | % | 0.16 | 0.01 |

The following results shown in Table 3, which all include example of 12-0-43 potassium nitrate at 6% coating by weight, also demonstrate examples of the consistency of fertilizer release at 100 degrees in water bath for and through 7 days. When placed in water at room temperature for 6 days, there was no prill failure.

invention have tighter upfront release of nutrient, which demonstrates complete safety to plants. The measurement of low soluble salts in these results confirm the stability of coating at accelerated temperatures.

TABLE 3

| SAMPLE ID | PARAMETER | UNIT | NUTRIENT RELEASE AT 100° F. | | |
|---|---|---|---|---|---|
| | | | DAY 1 | DAY 3 | DAY 7 |
| 05001 - Fertilizer 12-0-43 | Nitrogen | ppm | 1,490 | 10,000 | 27,700 |
| | Potassium | ppm | 1,300 | 12,000 | 71,000 |
| | Conductivity | mmhos/cm | 18.00 | 134.00 | 388.00 |
| 05002 - Fertilizer 12-0-43 | Nitrogen | ppm | 1,760 | 11,000 | 23,700 |
| | Potassium | ppm | 2,200 | 16,000 | 79,000 |
| | Conductivity | mmhos/cm | 23.00 | 148.00 | 413.00 |
| 05003 - Fertilizer | Nitrogen | ppm | 1,480 | 10,200 | 26,900 |

TABLE 3-continued

| SAMPLE | | | NUTRIENT RELEASE AT 100° F. | | |
|---|---|---|---|---|---|
| ID | PARAMETER | UNIT | DAY 1 | DAY 3 | DAY 7 |
| 12-0-43 | Potassium | ppm | 1,200 | 13,000 | 96,000 |
|  | Conductivity | mmhos/cm | 15.00 | 130.00 | 420.00 |
| 05004 - Fertilizer | Nitrogen | ppm | 1,260 | 11,600 | 27,700 |
| 12-0-43 | Potassium | ppm | 1,000 | 14,000 | 93,000 |
|  | Conductivity | mmhos/cm | 13.00 | 136.00 | 430.00 |
| 05005 - Fertilizer | Nitrogen | ppm | 1,120 | 10,600 | 28,200 |
| 12-0-43 | Potassium | ppm | 900 | 19,000 | 104,000 |
|  | Conductivity | mmhos/cm | 12.00 | 151.00 | 454.00 |
| 05006 - Fertilizer | Nitrogen | ppm | 1,380 | 11,300 | 25,900 |
| 12-0-43 | Potassium | ppm | 1,300 | 21,000 | 105,000 |
| Polymer Coated | Conductivity | mmhos/cm | 15.00 | 153.00 | 448.00 |

It should be understood that the above description is only representative of illustrative embodiments and examples. For the convenience of the reader, the above description has focused on a limited number of representative examples of all possible embodiments, examples that teach the principles of the invention. The description has not attempted to exhaustively enumerate all possible variations or even combinations of those variations described. That alternate embodiments may not have been presented for a specific portion of the invention, or that further undescribed alternate embodiments may be available for a portion, is not to be considered a disclaimer of those alternate embodiments. One of ordinary skill will appreciate that many of those undescribed embodiments, involve differences in technology and materials rather than differences in the application of the principles of the invention. Accordingly, the invention is not intended to be limited to less than the scope set forth in the following claims and equivalents.

The invention claimed is:

1. A process for producing polyurethane encapsulated, slow release fertilizer particles adapted to release fertilizer from said particles by osmosis through a semi-permeable membrane, wherein said particles are adapted to minimize susceptibility to flash release of fertilizer and further adapted to provide tight up-front release of fertilizers and a coat weight of no more than 9% of the composition, comprising:
   a) pre-sealing the fertilizer particles by applying a fine granular material and a vegetable oil to the particles;
   b) applying an isocyanate-reactive component consisting essentially of a polyether polyol formed by reacting an alkylene oxide with a glycerine nucleus onto fertilizer particles to form coated fertilizer particles;
   c) applying an isocyanate component onto said coated fertilizer particles of step a); and
   d) forming the polyurethane encapsulated fertilizer particles.

2. The method of claim 1 wherein the applications of steps b) and c) are executed to form the polyurethane encapsulated fertilizer particles in increments of 0.5 percent of said coating by weight.

3. The method of claim 1 wherein said alkylene oxide is propylene oxide.

4. The method of claim 1 wherein the polyether polyol's characteristics comprise:
   a hydroxyl number of from about 388 to about 408;
   a nominal functionality of about 3; and
   a nominal molecular weight of about 400.
   a viscosity of about 360 cps at about 77 degrees Fahrenheit, of about 160 cps at about 100 degrees Fahrenheit, and about 78 cps at about 120 degrees Fahrenheit.

5. The method of claim 1 wherein the isocyanate component comprises a polymethylene polyphenypolyisocyanate.

6. The method of claim 5 wherein the polymethylene polyphenylpolyisocyanate comprises characteristics including:
   a NCO content of about 31.5 percentage by weight;
   a viscosity of about 200 cps at about 25 degrees Celsius;
   a hydrolyzable chlorine of about 0.03 5 percentage by weight;
   a flash point of about 200 degrees Celsius;
   a density of about 1.23 g/cm3 at about 25 degrees Celsius;
   an initial boiling point of about 190 mm Hg at about 25 degrees Celsius; and
   a vapor pressure of about 0.0002 mm Hg at about 25 degrees Celsius.

7. A process for producing polyurethane encapsulated, slow release fertilizers adapted to release fertilizer by osmosis through a semi-permeable membrane adapted to minimize susceptibility to flash release and further adapted to provide tight up-front release of said fertilizers and a coat weight of no more than 9% of the composition, comprising:
   a) pre-sealing the fertilizer particles by applying a fine granular material and polyethylene to the particles;
   b) applying an isocyanate-reactive component consisting essentially of a polyether polyol formed by reacting an alkylene oxide with a glycerine nucleus onto fertilizer particles to form coated fertilizer particles;
   c) applying an isocyanate component onto said coated fertilizer particles of step a); and
   d) forming the polyurethane encapsulated fertilizer particles.

8. The method of claim 1 wherein the method further comprises: additionally applying an outer layer to the polyurethane encapsulated fertilizer particles.

9. The method of claim 8 wherein the outer layer comprises:
   wax; or polyethylene.

10. A polyurethane coating encapsulating a fertilizer wherein said coating is adapted to release fertilizer by osmosis through a semi-permeable membrane, wherein said coating is formed in part by the application of an isocyanate-reactive component consisting essentially of a polyether polyol, wherein said polyether polyol is formed by reacting an alkylene oxide with a glycerine nucleus, with an isocyanate component, and wherein said polyurethane encapsulated fertilizer is adapted to minimize susceptibility to flash release and further adapted to provide tight up-front release of said fertilizer and a coat weight of no more than 8% of the composition, in which the polyurethane is adapted to release nutrient from a nutrient substrate including potassium nitrate in the percentages of 12-0-43 (N-P-K) at rates comprising:

from about 1,120 ppm to about 35,000 ppm of nitrogen at 100 degrees Fahrenheit in about one day;
from about 5,200 ppm to about 74,000 ppm of nitrogen at 100 degrees Fahrenheit in about three days; and
from about 10,500 ppm to about 104,000 ppm of nitrogen at 100 degrees Fahrenheit in about seven days.

11. The polyurethane encapsulated, slow release fertilizer of claim 10 wherein said coating is up to about six percent of said coating by weight, and wherein said coating releases nutrient at rates comprising:

from about 1,000 ppm to about 15,000 ppm of potassium at 100 degrees Fahrenheit in about one day;
from about 3,000 ppm to about 170,000 ppm of potassium at 100 degrees Fahrenheit in about three days; and
from about 19,000 ppm to about 212,000 ppm of potassium at 100 degrees Fahrenheit in about seven days.

12. The polyurethane encapsulated, slow release fertilizer of claim 10 wherein said coating is about four percent of said coating by weight, and wherein said coating releases nutrient at rates comprising:

about 17,200 ppm of nitrogen at 100 degrees Fahrenheit in about one day;
about 74,000 ppm of nitrogen at 100 degrees Fahrenheit in about three days; and
about 104,000 ppm of nitrogen at 100 degrees Fahrenheit in about seven days.

13. The polyurethane encapsulated, slow release fertilizer of claim 10 wherein said coating is about five percent of said coating by weight, and wherein said coating releases nutrient at rates comprising:

from about 14,600 ppm to about 35,000 ppm of nitrogen at 100 degrees Fahrenheit in about one day;
from about 41,500 ppm to about 58,000 ppm of nitrogen at 100 degrees Fahrenheit in about three days;
from about 58,000 ppm to about 94,000 ppm of nitrogen at 100 degrees Fahrenheit in about seven days.

14. The polyurethane encapsulated, slow release fertilizer of claim 10 wherein said coating is about six percent of said coating by weight, and wherein said coating releases nutrient at rates comprising:

from about 1,120 ppm to about 12,400 ppm of nitrogen at 100 degrees Fahrenheit in about one day;
from about 8,600 pm to about 36,000 ppm of nitrogen at 100 degrees Fahrenheit in about three days; and
from about 16,500 ppm to about 54,000 ppm of nitrogen at 100 degrees Fahrenheit in about seven days.

15. The polyurethane encapsulated, slow release fertilizer of claim 11 wherein said coating is about four percent of said coating by weight, and wherein said coating releases nutrient at rates comprising:

about 12,000 ppm of potassium at 100 degrees Fahrenheit in about one day;
about 170,000 ppm of potassium at 100 degrees Fahrenheit in about three days; and
about 212,000 ppm of potassium at 100 degrees Fahrenheit in about seven days.

16. The polyurethane encapsulated, slow release fertilizer of claim 11 wherein said coating is about five percent of said coating by weight, and wherein said coating releases nutrient at rates comprising:

from about 12,000 ppm to about 15,000 ppm of potassium at 100 degrees Fahrenheit in about one day;
from about 45,000 ppm to about 120,000 ppm of potassium at 100 degrees Fahrenheit in about three days; and
from about 110,000 ppm to about 184,000 ppm of potassium at 100 degrees Fahrenheit in about seven days.

17. The polyurethane encapsulated, slow release fertilizer of claim 11 wherein said coating is about six percent of said coating by weight, and wherein said coating releases nutrient at rates comprising:

from about 1,000 ppm to about 10,000 ppm of potassium at 100 degrees Fahrenheit in about one day;
from about 3,000 ppm to about 90,000 ppm of potassium at 100 degrees Fahrenheit in about three days; and
about 56,000 ppm to about 105,000 ppm of potassium at 100 degrees Fahrenheit in about seven days.

18. The polyurethane encapsulated, slow release fertilizer of claim 10 wherein said coating is based upon an isocyanate component and an isocyanate-reactive component comprising a polyether polyol.

19. The polyurethane encapsulated, slow release fertilizer of claim 10 wherein said coating is about eight percent of said coating by weight, and wherein said coating releases nutrient at rates comprising:

about 2,300 ppm of nitrogen at 100 degrees Fahrenheit in about one day;
about 5,200 ppm of nitrogen at 100 degrees Fahrenheit in about three days; and
about 10,500 ppm of nitrogen at 100 degrees Fahrenheit in about seven days.

20. The polyurethane encapsulated, slow release fertilizer of claim 11 wherein said coating is about eight percent of said coating by weight, and wherein said coating releases nutrient at rates comprising:

about 1,000 ppm of potassium at 100 degrees Fahrenheit in about one day;
about 4,000 ppm of potassium at 100 degrees Fahrenheit in about three days; and
about 19,000 ppm of potassium at 100 degrees Fahrenheit in about seven days.

* * * * *

(12) EX PARTE REEXAMINATION CERTIFICATE (7879th)
United States Patent
Rosenthal et al.

(10) Number: US 7,267,707 C1
(45) Certificate Issued: Nov. 16, 2010

(54) POLYURETHANE ENCAPSULATED FERTILIZER

(75) Inventors: Edward Rosenthal, Long Boat Key, FL (US); Leon E. Padgett, Jr., Lakeland, FL (US)

(73) Assignee: Florikan Technologies, LLC, Sarasota, FL (US)

Reexamination Request:
No. 90/011,027, Jun. 24, 2010

Reexamination Certificate for:
Patent No.: 7,267,707
Issued: Sep. 11, 2007
Appl. No.: 11/093,552
Filed: Mar. 30, 2005

(51) Int. Cl.
*A01N 25/26* (2006.01)

(52) U.S. Cl. ............................ 71/64.11; 71/28; 71/64.07

(58) Field of Classification Search ................ None
See application file for complete search history.

(56) References Cited

U.S. PATENT DOCUMENTS 7,452,399 B2 * 11/2008 Whittington ................ 71/63

* cited by examiner

*Primary Examiner*—Dwayne C Jones

(57) ABSTRACT

A polyurethane encapsulated, slow release fertilizer with a coating based upon an isocyanate component and an isocyanate-reactive component comprising a polyether polyol. The process for producing such particles comprises applying an isocyanate-reactive component comprising a polyether polyol onto fertilizer particles to form coated fertilizer particles, applying an isocyanate component onto said coated fertilizer particles; and forming the polyurethane encapsulated fertilizer particles.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-20 is confirmed.

* * * * *